(12) United States Patent
Zhao

(10) Patent No.: US 7,950,272 B2
(45) Date of Patent: May 31, 2011

(54) APPARATUS FOR DETECTING SEALABILITY OF LITHIUM ION CELL

(75) Inventor: Junfeng Zhao, Shenzhen (CN)

(73) Assignee: Shenzhen Bak Battery Co., Ltd., Shenzhen, Guangdong Province (CN)

( * ) Notice: Subject to any disclaimer, the term of this patent is extended or adjusted under 35 U.S.C. 154(b) by 468 days.

(21) Appl. No.: 12/279,422

(22) PCT Filed: Aug. 17, 2006

(86) PCT No.: PCT/CN2006/002099
§ 371 (c)(1),
(2), (4) Date: Aug. 14, 2008

(87) PCT Pub. No.: WO2007/093091
PCT Pub. Date: Aug. 23, 2007

(65) Prior Publication Data
US 2009/0044602 A1    Feb. 19, 2009

(30) Foreign Application Priority Data

Feb. 14, 2006    (CN) ...................... 2006 2 0055023 U

(51) Int. Cl.
*G01M 3/04* (2006.01)

(52) U.S. Cl. ........................................................ 73/49.8
(58) Field of Classification Search .................... 73/49.8
See application file for complete search history.

(56) References Cited

U.S. PATENT DOCUMENTS

| 6,143,216 A * | 11/2000 | Loch et al. .................... 264/45.1 |
| 6,171,723 B1 * | 1/2001 | Loch et al. .................... 429/217 |
| 7,449,033 B2 * | 11/2008 | Ward et al. .................... 29/623.3 |

* cited by examiner

*Primary Examiner* — Hezron Williams
*Assistant Examiner* — Rodney T Frank
(74) *Attorney, Agent, or Firm* — Tim Tingkang Xia; Morris, Manning & Martin, LLP

(57) ABSTRACT

An apparatus for detecting the sealability of a lithium ion cell comprises a container which is filled with a detecting liquid, a clamp and a high-pressure-gas joint member. The clamp can carry a lithium ion cell to be detected and put it into said container. One end of the high-pressure-gas joint member is connected to an injecting hole of the lithium ion cell to be detected and the other end is connected to a high-pressure gas supply. The detecting apparatus also comprises an elevator which can move the lithium ion cell into and out the detecting liquid within the container.

10 Claims, 3 Drawing Sheets

APPARATUS FOR DETECTING SEALABILITY OF LITHIUM ION CELL

FIELD OF THE INVENTION

The present invention relates to detection devices for properties of cells and, more particularly to an apparatus for detecting sealability of a lithium ion cell.

BACKGROUND

Lithium ion cells have been widely used in a variety of industrial products such as notebook personal computers, video cameras, digital cameras, personal digital assistants (PDAs), mobile communication terminals, and electromotion instruments. The lithium ion cells have many varieties in size, a wide application and a large market demand. Further, the lithium ion cells can be applied in some rigor circumstances such as rather low temperature and rarefied atmosphere for polar science research and climbing adventure. The lithium ion cells also sever as energy drivers with high power discharge.

Generally, there is a serious demand for sealability of such a specific cell applied in serious conductions. In current, two types of detection devices are available for detecting the sealability of a lithium ion cell.

One typical detection device includes a detection bottle with liquid accommodated therein. A detecting pipe and an evacuating pipe penetrate through opening of the bottle. One open end of the detecting pipe is submerged in the liquid accommodated in the bottle. A needle penetrates through an injecting hole of the cell and is in communication with the cell at one end thereof via a sealing member. The other end of the needle is in communication with the detecting pipe through a gas pipe.

In detecting operation, air is evacuated from the detection bottle for several seconds. During evacuating process, it is observed whether bubbles continuously arise from the detecting pipe. If there are bubbles arising from the detecting pipe, it is determined that the detected lithium ion cell has a sealability problem. In reverse, the detected lithium ion cell has a good sealability.

However, this detection device has slow detection speed and insufficient precision. For example, it takes about five minutes to detect whether there is a slight leakage at joints among an upper cover, a lower cover and the cylinder body of a certain cylindrical energy cell under a vacuum pressure of about 0.05 MPa.

The other type of detection device includes a container containing a detecting liquid, a clamp, and a high-pressure gas connection device. The clamp is used to clip and position the measured lithium ion cell in the container. The two ends of the high-pressure gas connection device are respectively in communication with the injecting hole of the lithium ion cell and a high-pressure gas supply.

In detecting operation, the measured lithium ion cell is submerged in the detecting liquid within the container, and then the cell inside is filled with high-pressure gas for several seconds. In the meantime, it is observed whether bubbles arise from the detecting liquid within the container. If there are bubbles arising from the detecting liquid, it is determined that the detected lithium ion cell has a sealability problem. In reverse, the detected lithium ion cell has a good sealability.

The second device allows for a relatively higher detecting speed than the first device. Nevertheless, to maintain a dry inside the lithium ion cell and produce no influence on the sequential liquid filling process, the detecting liquid must be filled into the container after positioning the cell in the container. Further, after accomplishing detection operation, the detecting liquid must be discharged out of the container prior to taking out the cell from the container. Accordingly, the second device requires a complicated operation. Thus, it is desired to improve operation efficiency of the detection device.

SUMMARY OF THE INVENTION

An object of the present invention is to provide an apparatus for detecting the sealability of a lithium ion cell, which is readily operated and achieves swiftly moving of the cell.

To achieve the above object, in accordance with an aspect of the present invention, an apparatus for detecting the sealability of a lithium ion cell is provided. The apparatus comprises a container containing a detecting liquid, a clamp configured for clipping and positioning the measured lithium ion cell in the container, and a high-pressure gas joint member. One end of the high-pressure gas joint member is in communication with an injecting hole of the measured cell and the other end is in communication with a high-pressure gas supply. The detecting device further comprises an elevator configured for controlling the clamp to move the measured cell into and out the detecting liquid within the container.

More specifically, the elevator comprises a movable bracket and an energy supply for driving the movement of the bracket. The clamp is secured to the bracket.

More specifically, the energy supply is disposed on a supporting member. The bracket engages the supporting member through a guide rail and a guide groove.

More specifically, the container has an opening covered by a cover. The cover defines an aperture allowing the clamp to pass through.

More specifically, the container is made of a transparent material and is disposed on a baseboard. A rotating platform is attached to the baseboard for driving the container to rotate.

More specifically, a lighting device is disposed around a peripheral of the container.

More specifically, the clamp comprises a base, a connecting member, a spring, a housing accommodating the spring, and a sealing member both disposed on the base. The connecting member projects out of an end of the housing and is connected to an energy supply. The two ends of the spring are connected to the connecting member and the sealing member. The sealing member slidably engages the housing. The sealing member and the base cooperatively form a receiving space for holding the measured cell therein.

More specifically, the high-pressure gas joint member is a gas passage defined inside the sealing member of the clamp. The gas passage communicates the injecting hole of the measured cell to the high-pressure gas supply.

More specifically, a gasket is disposed at a bottom surface of the sealing member.

More specifically, the energy supply is one of a gas cylinder, an electromotion motor, and a pneumatic motor.

The detecting apparatus of the present invention utilizes the elevator to control the clamp to move the measured cell into and out the detecting liquid within the container and thus avoids frequently filling and discharging of the detecting liquid within the container. This provides convenience for moving the measured cell 100 into and out the container, thereby reducing operation period and improving operation efficiency of the detecting apparatus. Further, the housing, the spring and the sealing member of the clamp provide convenience for positioning and sealing the measured cell. The measured cell 100 can be swiftly fastened in the clamp 2 under the control of a gas cylinder, thereby further improving working efficiency of the detecting apparatus.

BRIEF DESCRIPTION OF THE DRAWINGS

The present invention will become more apparent from the following detailed description when taken in conjunction with the accompanying drawings, in which.

DETAILED DESCRIPTION OF THE PREFERRED EMBODIMENTS

Figure 1:
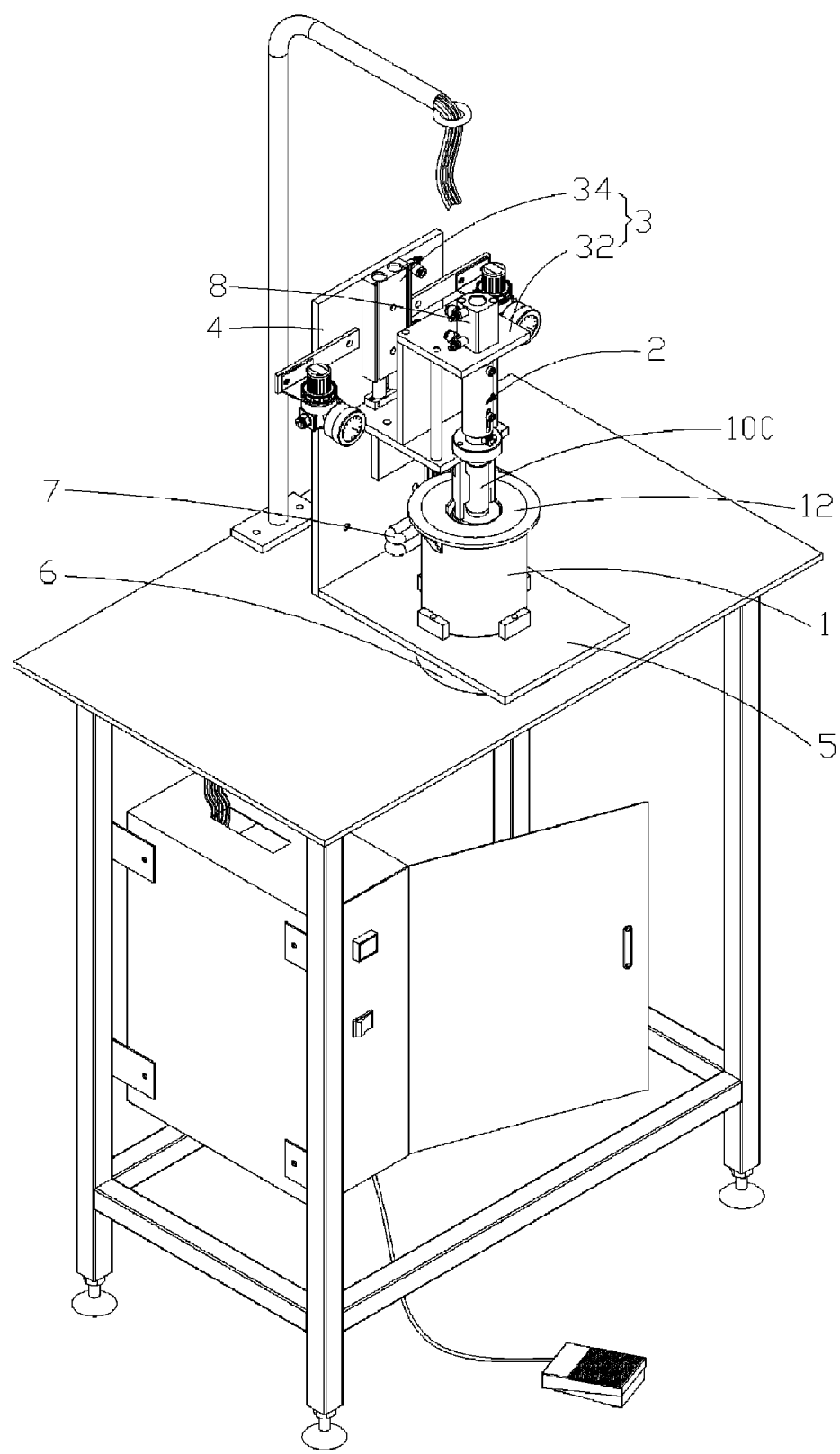
FIG. 1 is a schematic view of an apparatus for detecting the sealability of a lithium ion cell, in accordance with a preferred embodiment of the present invention.
Figure 2:
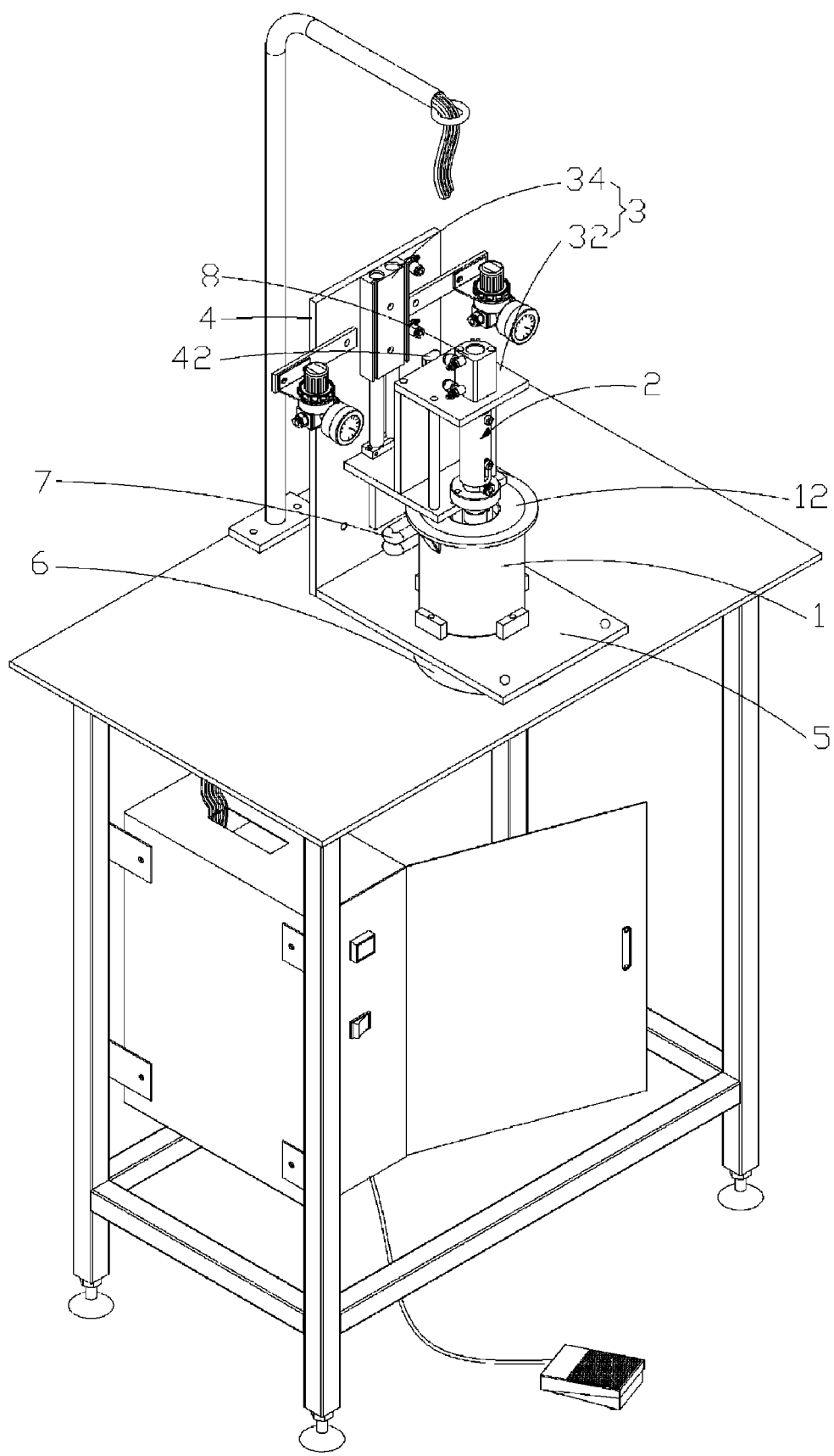
FIG. 2 is schematic view of the detecting apparatus of FIG. 1 in another status.

Referring to FIGS. 1 and 2, in accordance with a preferred embodiment of the present invention, an apparatus for detecting the sealability of a lithium ion cell 100 includes a container 1 containing a detecting liquid therein, a clamp 2, a high-pressure gas joint member, and an elevator 3. The clamp 2 is configured for clipping and positioning the measured lithium ion cell 100 in the container 1. One end of the high-pressure gas joint member is in communication with an injecting hole of the measured cell 100 and the other end is connected to a high-pressure gas supply (not shown). The elevator 3 is configured for controlling the clamp 2 to moving the measured cell 100 into and out the detecting liquid within the container 1.

The elevator 3 includes a movable bracket 32 and a gas cylinder 34 for driving the supporting member 32 to move. The clamp 2 is attached to the bracket 32. The gas cylinder 34 is fixed on a supporting member 4. A guide rail 42 is disposed on the supporting member 4. The bracket 32 defines a guide groove (not shown) for engaging the guide rail 42 so that the bracket 32 may smoothly move up and down along the supporting member 4. Apparently, the slide rail 42 could be disposed on the bracket 32 while the guide groove could be defined in the supporting member 4.

The container has an opening covered by a cover 12. The cover 12 defines an aperture 120 (not labeled) for allowing the clamp 2 to pass through so as to prevent evaporation of the detecting liquid within the container 1. The container 1 is made of a transparent material. In this embodiment, the container 1 is a glass vessel and is disposed on a baseboard 5. The baseboard 5 is rigidly secured to the supporting member 4 with a rotating platform 6 attached thereto, for providing convenience for observation inside the container 1. The rotating platform 6 allows for rotation of the baseboard 5 together with the supporting member 4, the container 1, the clamp 2 and the elevator 3. Further, a lighting device 7 is disposed around peripheral of the container 1.

Figure 3:
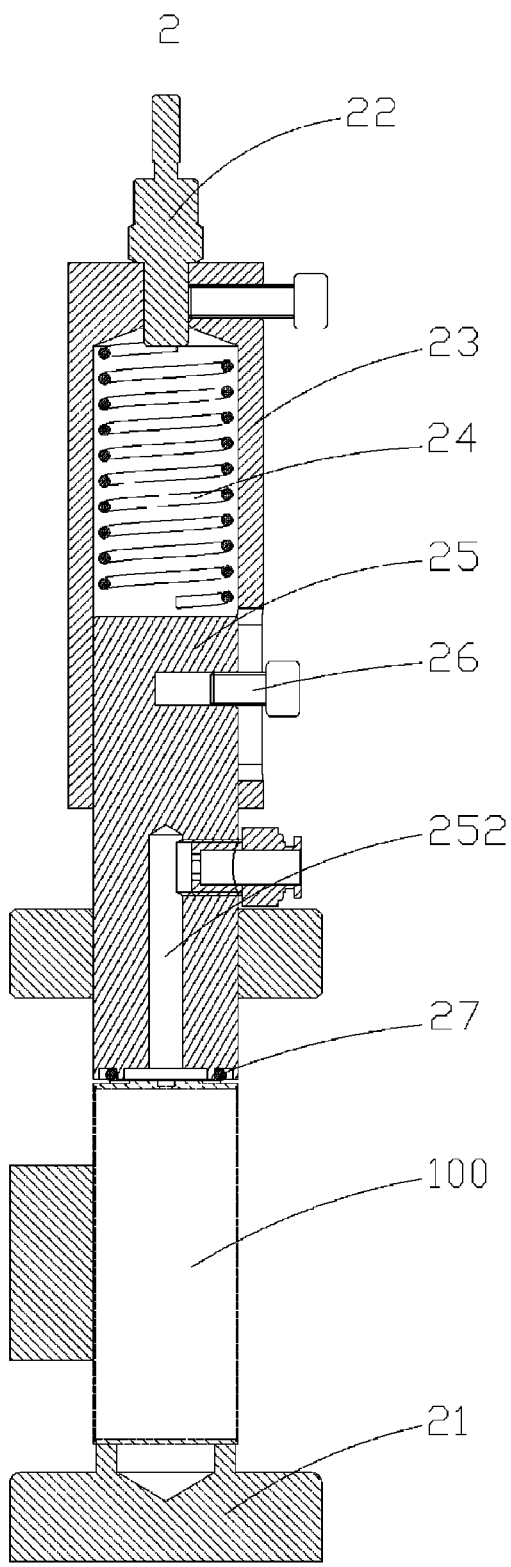
FIG. 3 is schematic, cutaway view of a clamp clipping the cell of FIG. 1.

Referring to FIG. 3 along with FIGS. 1 and 2, the clamp 2 includes a base 21, a connecting member 22, a spring 24, a housing 23 accommodating the spring 24 therein, and a sealing member 25. The connecting member 22 projects out of an end of the housing 23 and is connected to a gas cylinder 8. The two ends of the spring 24 are respectively connected to the connecting member 22 and the sealing member 25. The sealing member 25 slidably engages the housing 22 using a pin 26. The sealing member 25 and the base 21 cooperatively form a receiving space for holding the measured cell 100 therein. The injecting end of the connecting member 22 is connected to one end of the spring 24. The sealing member 25 inside defines a gas passage 252 allowing for gas flow. The gas passage 252 communicates an injecting hole defined in the upper cover of the cell 100 to the high-pressure gas supply. The bottom surface of the sealing member 25 defines an annular slot receiving a gasket 27 therein, for providing an enhanced seal during detecting operation. In this embodiment, the gasket 27 is an O-shaped ring.

In operation of the above detecting apparatus, the bracket 32 is firstly elevated up to a certain height by the drive of the energy supply 34. The measured cell 100 without liquid filled is mounted on the clamp 2. The gas cylinder 8 presses the spring 24 through the connecting member 22 and then the spring 24 presses and moves down the sealing member 25, accordingly securely fastening the measured cell 100. The gas cylinder 34 drives the bracket 32 to move downward to immerse the entire measured cell 100 into the detecting liquid within the container 1. High-pressure dried gas is continuously filled inside the measure cell 100 for several seconds through the gas passage 252 by the high-pressure gas supply. During filling process, the baseboard 5 is driven to rotate along with the rotating member 6 for allowing an all-directional observation to determine whether there are bubbles arising from the detecting liquid within the container 1. After accomplishing detecting operation, the bracket 32 is elevated up to such a height under the drive of the gas cylinder 34 that the measured cell 100 is taken away from the clamp 2.

In other embodiments, the two gas cylinders 34 and 8 could be replaced with, e.g., an electromotion motor, and a pneumatic motor, among other energy supplies, to provide the apparatus with energy supply.

INDUSTRIAL APPLICATION

In accordance with a preferred embodiment of the present invention, the present detecting apparatus utilizes the elevator 3 to control the clamp 2 to move the measured cell into and out the detecting liquid within the container and thus avoids frequently filling and discharging of the detecting liquid within the container 1. This provides convenience for moving the measured cell 100 into and out the container, thereby reducing operation period and improving operation efficiency of the detecting apparatus. Further, the housing 23, the spring 24 and the sealing member 25 of the clamp 2 provide convenience for positioning and sealing the measured cell 100. The measured cell 100 can be swiftly clipped and fastened to the clamp 2, thereby further improving working efficiency of the detecting apparatus.

What is claimed is:

1. An apparatus for detecting sealability of a lithium ion cell, the apparatus comprising:
   a container containing a detecting liquid;
   a clamp configured for clipping and positioning the measured lithium ion cell in the container;
   a high-pressure gas joint member in communication with an injecting hole of the measured cell by one end thereof, the other end being in communication with a high-pressure gas supply; and
   an elevator configured for controlling the clamp to move the measured cell into and out the detecting liquid within the container.

2. The apparatus as claimed in claim 1, wherein the elevator comprises a movable bracket and an energy supply for driving the movement of the bracket, the clamp being secured to the bracket.

3. The apparatus as claimed in claim 2, wherein the energy supply is disposed on a supporting member, the bracket engaging the supporting member through a guide rail and a guide groove.

4. The apparatus as claimed in claim 1, wherein the container has an opening covered by a cover, the cover defining an aperture allowing the clamp to pass through.

5. The apparatus as claimed in claim 1, wherein the container is made of a transparent material and is disposed on a baseboard, a rotating platform being attached to the baseboard for driving the container to rotate.

6. The apparatus as claimed in claim 5, further comprising a lighting device disposed around a peripheral of the container.

7. The apparatus as claimed in claim 1, wherein the clamp comprises a base, a connecting member, a spring both disposed on the base, a housing accommodating the spring, and a sealing member both disposed on the base, the connecting member projecting out of an end of the housing and being connected to an energy supply, the two ends of the spring being respectively connected to the connecting member and the sealing member, the sealing member slidably engaging the housing, the sealing member and the base cooperatively forming a receiving space for holding the measured cell therein.

8. The apparatus as claimed in claim 7, wherein the high-pressure gas joint member is a gas passage defined inside the sealing member of the clamp, the gas passage communicating the injecting hole of the measured cell to the high-pressure gas supply.

9. The apparatus as claimed in claim 8, further comprising a gasket disposed at a bottom surface of the sealing member.

10. The apparatus as claimed in claim 7, wherein the energy supply is one of a gas cylinder, an electromotion motor, and a pneumatic motor.

* * * * *